United States Patent [19]

Dujari et al.

[11] Patent Number: 5,239,636
[45] Date of Patent: Aug. 24, 1993

[54] BUFFER MEMORY SUBSYSTEM FOR PERIPHERAL CONTROLLERS

[75] Inventors: Vineet Dujari, Sunnyvale; Nicos Syrimis, both of Santa Clara, Calif.

[73] Assignee: Advanced Micro Devices, Inc., Sunnyvale, Calif.

[21] Appl. No.: 242,743

[22] Filed: Sep. 9, 1988

[51] Int. Cl.$^5$ .......................... G06F 9/00; G06F 12/00
[52] U.S. Cl. ................................ 395/425; 364/238.3; 364/242.6; 364/256.8; 364/DIG. 1
[58] Field of Search ... 364/200 MS File, 900 MS File; 395/400, 425, 325, 725

[56] References Cited

U.S. PATENT DOCUMENTS

| | | | |
|---|---|---|---|
| 4,075,691 | 2/1978 | Davis et al. | 364/200 |
| 4,236,210 | 11/1980 | Terakawa et al. | 364/200 |
| 4,538,224 | 8/1985 | Peterson | 364/200 |
| 4,593,324 | 6/1986 | Ohkubo et al. | 358/261 |
| 4,604,683 | 8/1986 | Russ et al. | 364/200 |
| 4,875,154 | 10/1989 | Mitchell | 364/200 |

FOREIGN PATENT DOCUMENTS

| | | |
|---|---|---|
| 221763 | 10/1986 | European Pat. Off. . |
| 61-189386 | 8/1986 | Japan . |
| WO83/02180 | 12/1982 | PCT Int'l Appl. . |
| WO89/00312 | 5/1988 | PCT Int'l Appl. . |
| 8302180 | 6/1983 | World Int. Prop. O. ......... 364/200 |

OTHER PUBLICATIONS

Beukema et al., "Transparent Mode in an I/O Controller," *IBM Technical Disclosure Bulletin*, vol. 26, No. 11, Apr. 1984, pp. 5956-5959.

*Primary Examiner*—Parshotam S. Lall
*Assistant Examiner*—Ayni Mohemed
*Attorney, Agent, or Firm*—Lowe, Price, Leblanc & Becker

[57] ABSTRACT

A buffer memory subsystem for a peripheral controller. A CPU is provided for initiating data transfer. A host adapter is also provided. A memory buffer is used to store data temporarily. The peripheral controller is adapted for operating in an environment having at least two data communications buses: a CPU data communications bus connected between the CPU and the peripheral controller, and a buffer data communications bus, isolated from the CPU data communications bus, and connected to the peripheral controller, to the memory buffer and to the host adapter. In this way, a mechanism is provided to allow the CPU to access the memory buffer by means of the peripheral controller.

16 Claims, 4 Drawing Sheets

BUFFER MEMORY SUBSYSTEM FOR PERIPHERAL CONTROLLERS

BACKGROUND OF THE INVENTION

The present invention relates to a buffer memory subsystem for use in data processing systems and, more particularly, to a buffer memory subsystem that facilitates access of data stored in a buffer memory by a peripheral controller.

In the field of data processing, peripheral devices such as mass storage devices, printers, modems and the like often require certain control logic for proper operation. In earlier, simple systems, the central processing unit (CPU) controlled peripheral equipment operations directly. But as systems became more sophisticated, more peripheral devices were added to complex systems and the speed of data processing operations increased, it became evident that CPU's could not adequately control peripheral equipment and still be available for other duties, such as system control, interfacing and data manipulation.

In previous systems, a CPU was connected to one or more peripheral devices over a single data communications channel or bus. Throughput of the single data communications bus, however, was soon degraded when the CPU attempted to access or communicate with two or more devices.

As peripheral equipment became more efficient, each device could perform more activities faster, thus increasing overall data communications bus usage. This increase in bus communications resulted in increased risk of data bottleneck. Thus, more sophisticated arbitration mechanisms were required to control communications among the peripheral equipment devices and the CPU.

A great advance in efficiency in data processing systems occurred when controllers were developed to control peripheral devices intelligently so that CPU's could be freed for other operations. Each peripheral controller was provided to control individual peripheral devices on the bus. It is most efficient for a peripheral controller to control one or more devices of the same type (e.g., magnetic hard disks).

To increase the efficiency of systems further, two communications buses were then provided. In this way, a high speed, efficient data communications bus could be used for high speed communications between the peripheral controller and the peripheral devices. On the other hand, a slower, less efficient CPU data communications bus could be used between the CPU and the peripheral controller, since data communications between CPU and controller generally need not be handled at the same high rate of speed as are communications between controller and peripheral devices for overall system management.

The use of a dynamic memory as a buffer device connected to the communications bus between the peripheral devices and the peripheral controller was also proven to be very effective. The buffer memory allowed data from the peripheral device (e.g., disk) to be stored temporarily, pending correction, for instance. This could occur while data input to the system from a high speed data communications bus, such as a small computer system interface (SCSI), which is attached to a host processor, could be transmitted to the peripheral controller directly. In this way, communications between the peripheral device and the peripheral controller need not limit other, higher speed communications between the host processor and the rest of the peripheral subsystem.

The data communications bus disposed between peripheral controller and buffer memory is known as a buffer bus. Although the peripheral controller has access to the buffer bus in most cases, occasionally it is the CPU that requires access to devices located on the buffer bus. In those cases, when the CPU and the peripheral controller are in contention for the buffer bus, an arbitration mechanism is required.

Heretofore, an arbiter was provided between the buffer bus and the peripheral controller and CPU. This arbiter consisted of external logic, requiring separate transceivers for communications with the peripheral controller and with the CPU. Recently, a desire for fewer components taking less space on printed circuit boards has made arbiters of the foregoing description inappropriate.

It would be advantageous to provide an arbiter function without using external logic.

It would also be advantageous to provide an arbitration mechanism within a peripheral controller itself.

It would also be advantageous to allow a CPU to access a buffer bus when necessary without contending with a peripheral controller.

It would also be advantageous to permit a buffer memory subsystem to operate with two separate communication buses isolated from one another.

It would also be advantageous to provide an arbitration mechanism in a peripheral controller to arbitrate buffer bus access requests from a plurality of initiating devices.

SUMMARY OF THE INVENTION

In accordance with the present invention, there is provided a buffer memory subsystem for a peripheral controller. A CPU is provided for initiating data transfer. A host adapter is also provided. A memory buffer is used to store data temporarily. The peripheral controller is adapted for operating in an environment having at least two data communications buses: a CPU data communications bus connected between the CPU and the peripheral controller, and a buffer data communications bus, isolated from the CPU data communications bus, and connected to the peripheral controller, to the memory buffer and to the host adapter. In this way, a mechanism is provided to allow the CPU to access the memory buffer by means of the peripheral controller.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1:
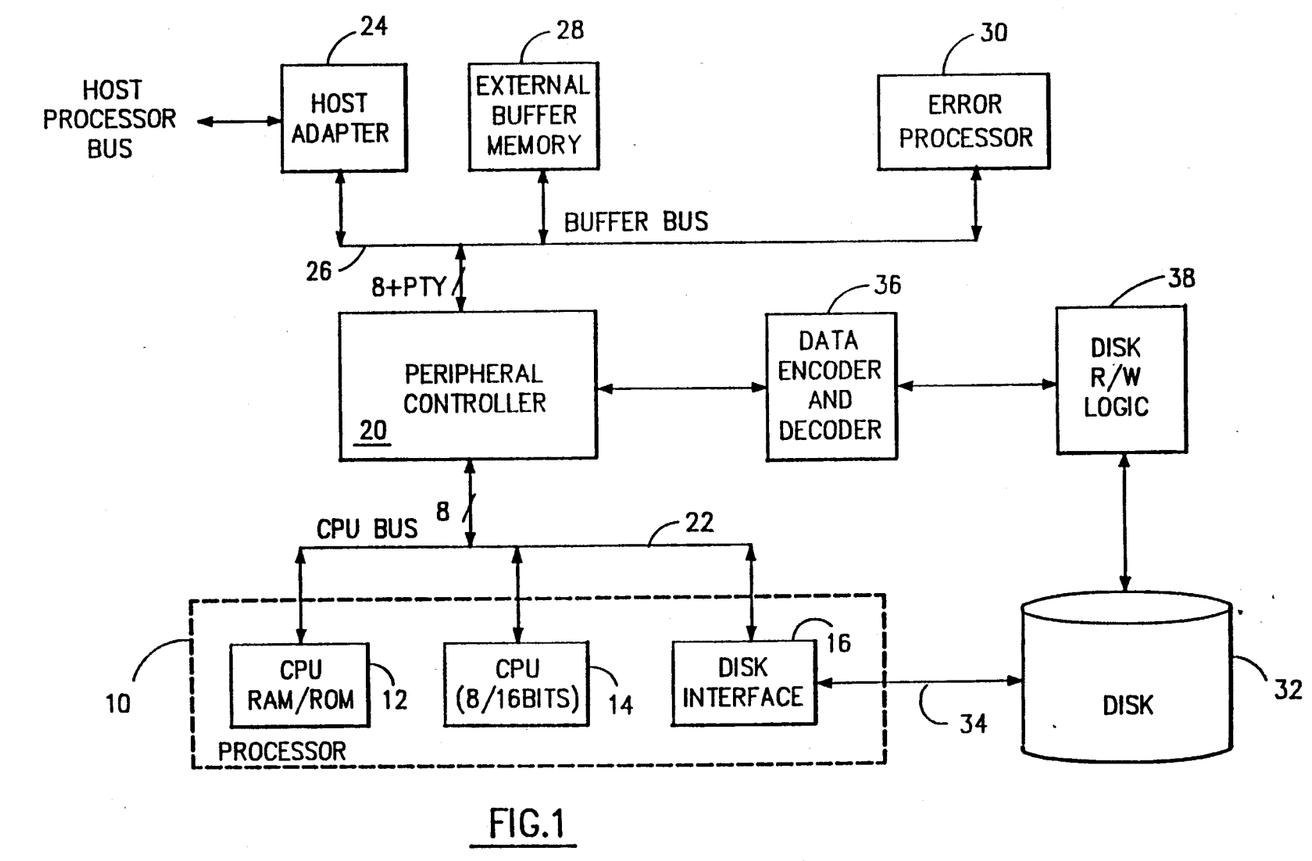
FIG. 1 is a block diagram of the buffer memory subsystem in accordance with the present invention.

Referring now to FIG. 1 there is shown a block diagram of the buffer memory subsystem, also known as a disk controller, in accordance with the present invention. The subsystem is an intelligent peripheral to a microprocessor or microcontroller, assuming the tasks of data serial format handling, data integrity and disk data management. A processor shown generally at reference numeral 10 in phantom includes a RAM/ROM memory 12, a central processing unit 14 and a disk interface 16. Processor 10 can be fabricated on one integrated circuit chip, as shown in phantom in the FIGURE, but it should be understood that processor 10 is a logical device having three separate components: memory 12, CPU 14 and disk interface 16. Processor 10 performs SCSI command interpretation, disk data space allocation, disk mechanical control and system interface management. For simplicity of description and to avoid confusion with a host processor described below, processor 10 will hereinafter be referred to as CPU 10.

CPU 10 is connected to a peripheral controller 20, which is connected to the components of CPU 10 by means of a CPU bus 22.

Also connected to peripheral controller 20 is a host adapter 24. Host adapter 24 is connected to a host processor, not shown, over a suitable high-speed data communications bus, such as an SCSI bus. Host adapter 24 is connected to peripheral controller 20 by means of an 8-bit wide buffer bus 26. This buffer bus 26 actually consists of an address portion and a data portion, not differentiated in this FIGURE. Also connected to buffer bus 26 is an external buffer memory 28 and an error processor 30.

Peripheral controller 20 is the master of buffer memory bus 26 at all times. CPU 10 can access this bus 26 only when peripheral controller 20 performs necessary arbitration, as described in greater detail hereinbelow. Host data transfers between an SCSI device such as a processor, not shown, and external buffer memory 28 can take place on buffer bus 26 without affecting CPU data bus 22. That is, the host to peripheral controller data interface is fully autonomous and independent of CPU 10. A direct control/data connection allows the two devices to perform preprogrammed data transfers with minimal CPU intervention.

A disk 32 is also provided in the system and is connected to CPU 10 by means of line 34. Disk 32 is a magnetic hard disk in the preferred embodiment, but may also be an optical hard disk or any other suitable form of mass storage. Connected between disk 32 and peripheral controller 20 are a data encoder and decoder 36 and a disk read/write logic device 38.

Figure 2:
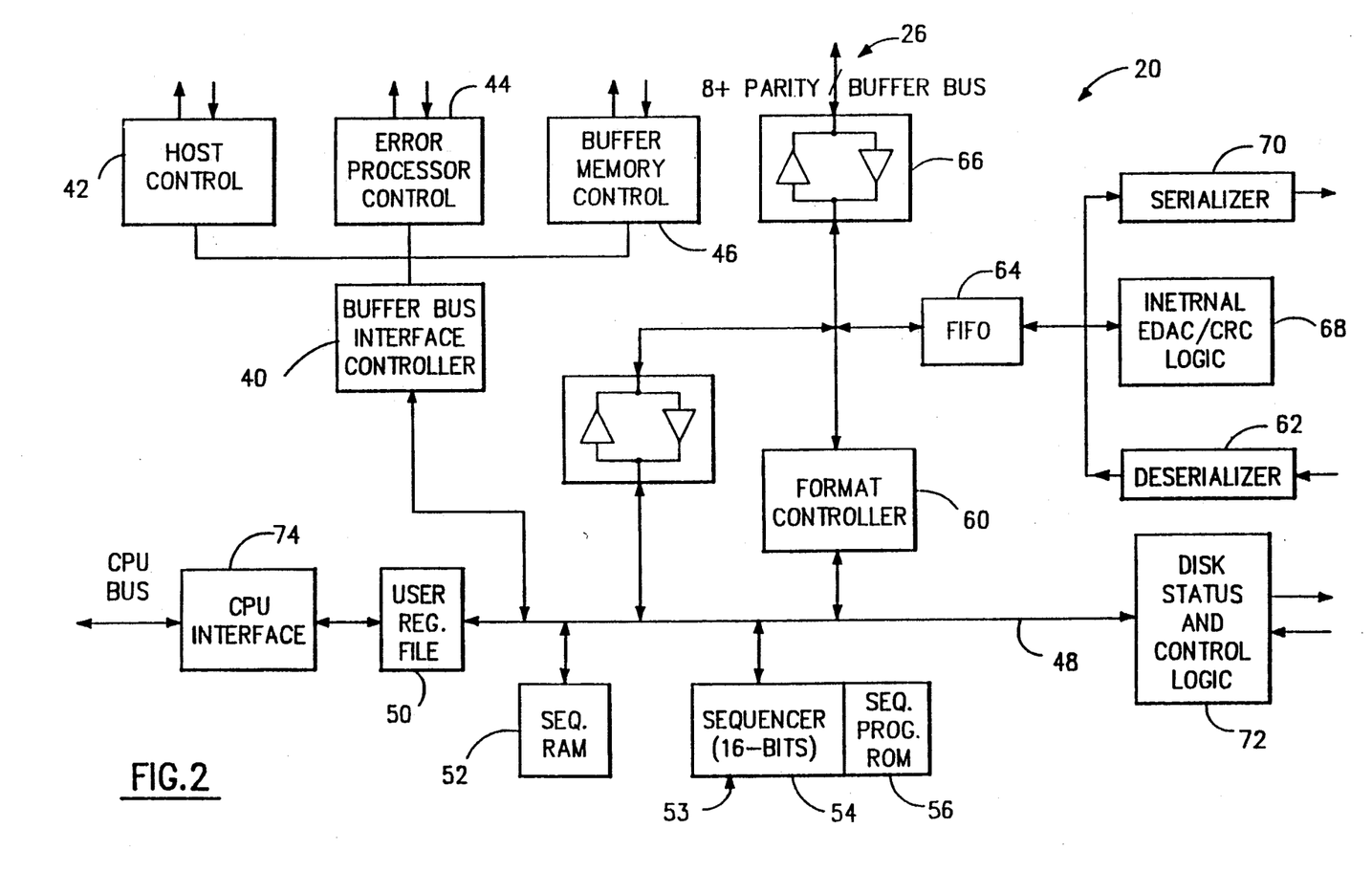
FIG. 2 is block diagram of the peripheral controller of the buffer memory subsystem.

Referring now also to FIG. 2, there is shown a block diagram of peripheral controller 20 (FIG. 1) in greater detail. A buffer bus interface controller 40 is used for arbitration of data that is intended to be transmitted over buffer bus 26.

A control device 42 for a host processor, not shown, corresponds to host adapter 24 (FIG. 1) and is connected to buffer bus interface controller 40. Similarly, an error processor control device 44 is also connected to buffer bus interface controller 40 and corresponds to error processor 30 (FIG. 1). A buffer memory control device 46 is likewise connected to buffer bus interface controller 40 and corresponds to external buffer memory 28 (FIG. 1). Buffer memory control device 46 is responsible for data buffering and handling. Controlling up to 4 Mbytes of dynamic buffer memory directly, the flow of data between disk 32 and host processor bus is managed via buffer memory control device 46 without CPU intervention.

An internal sequencer data bus 48 has connected to it buffer bus interface controller 40 as well as a user register file 50, an internal sequencer RAM 52, and a sequencer unit 53, which includes a 16-bit sequencer 54 and a sequencer program ROM 56.

Also connected to internal sequencer bus 48 is a format controller 60. Format control is a function provided in software in the preferred embodiment which can be loaded according to predetermined user disk protocol criteria. Format controller 60, however, can also be hard wired in alternate embodiments to provide a fixed format control.

A deserializer 62 is connected to a first in first out (FIFO) register 64 which, in turn, is connected to a buffer 66 attached to buffer bus 26.

Internal error detection and correction logic 68 is also provided and is connected to FIFO register 64. A serializer 70 is connected to FIFO 64 for converting data into a form suitable for disk 32 (FIG. 1).

A unit for providing disk status and control logic is shown at reference numeral 72. This unit 72 initiates signals prior to reading from or writing to disk 32. Initiating signals can also be generated by format controller 60. Connected to user register file 50 is a CPU interface 74, which is attached to CPU bus 22 (FIG. 1).

Figure 3:
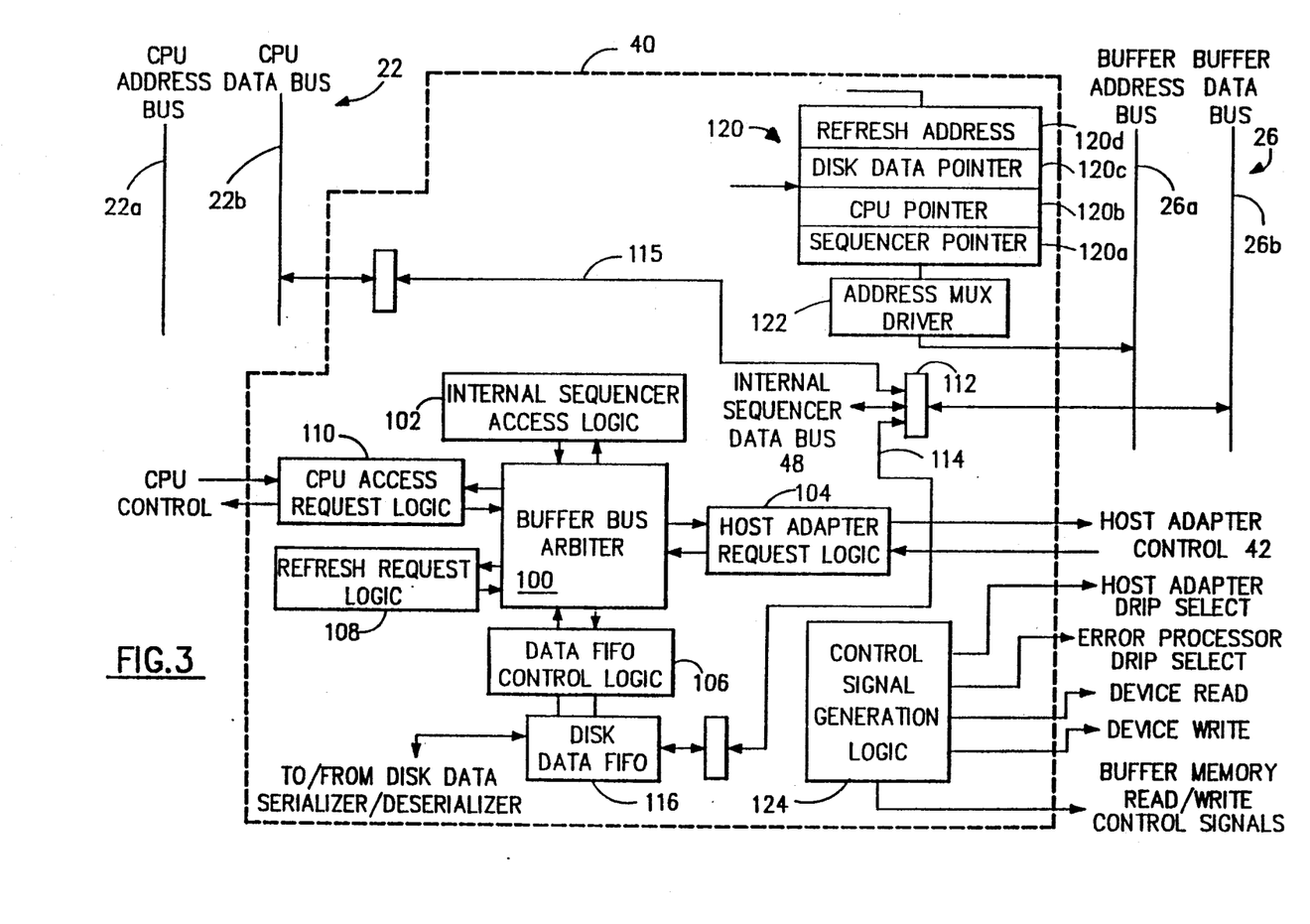
FIG. 3 is a block diagram of the arbitration mechanism of the peripheral controller.

Referring now also to FIG. 3 there is shown a detailed block diagram of the arbitration mechanism of the present invention, as embodied in buffer bus interface controller 40 (FIG. 2) of peripheral controller 20 (FIG. 1).

Buffer bus interface controller 40 is disposed intermediate CPU communications bus 22, comprising an address bus 22a and a data bus 22b, and the two portions (address and data) of buffer bus 26. The heart of buffer bus interface controller 40 is a buffer bus arbiter unit 100. Arbiter 100 can be designed to be preemptible and can support single byte or multiple byte bursts depending upon the user's application requirements.

Connected to arbiter 100 are an internal sequencer access logic unit 102, a host adapter request logic unit 104, a data FIFO control logic unit 106, a refresh request logic unit 108 and a CPU access request logic unit 110. Each of the aforementioned units 102–110 is connected to arbiter 100 by means of request and acknowledge lines, that are used in a conventional manner.

Connected to host adapter request logic unit 104 are lines to host adapter control 42. An interface port 112 is connected to buffer data bus 26b, the data portion of buffer bus 26. Connected to interface port 112 is also line 115, to which is connected CPU data bus 22b.

A disk data FIFO unit 116 is connected both to data FIFO control logic unit 106 and to interface port 112 by means of line 114. Disk data FIFO unit 116 is also adapted to transmit data to disk data serializer 70 (FIG. 2) and to receive data from disk data deserializer 62.

Connected to buffer address bus 26a is a series of pointers, shown generally at reference numeral 120. Pointers 120 include a sequencer pointer 120a, a CPU pointer 120b, a disk data pointer 120c and a refresh address pointer 120d. Connected between pointers 120 and buffer address bus 26a is an address multiplexer driver 122, which allows addresses from one pointer at a time to be loaded onto the address portion of buffer bus 26.

A logic unit for generating control signals is also provided and identified by reference numeral 124. Unit 124 is adapted to generate a plurality of buffer memory read/write control signals as well as device read and device write signals and host adapter and error processor select signals.

Figure 4:
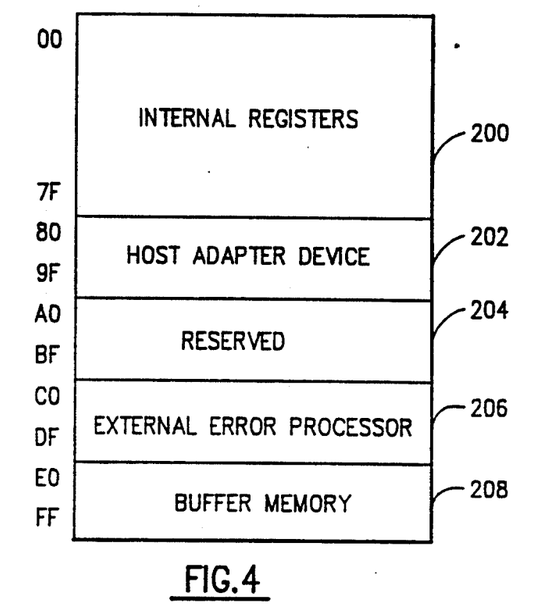
FIG. 4 is an address assignment diagram of the peripheral controller.

Referring now also to FIG. 4, there is shown an address assignment diagram of peripheral controller 20 (FIG. 1).

Peripheral controller 20 has an address space of 256 byte-wide locations. Of these 256 locations, 128 addresses (00 through 7F) are mapped into internal registers. The remaining addresses (80 through FF) allow CPU 10 to access devices/memory on buffer bus 26.

The internal register file can be further divided into hardware parameters, operating parameters, command parameters and status parameters. Additionally, a master control register provides overall device control.

The lowest 128 locations from address 00 through 7F, referencing internal registers, are shown generally as reference numeral 200. Locations 80 through 9F represent 32 locations shown as reference numeral 202. These locations are mapped into host adapter device 24 (FIG. 1). Following reserved locations 204 having addresses A0 through BF are 32 locations from address C0 through DF, which represent locations that are mapped into error processor 30 (FIG. 1) and are shown as reference numeral 206. Finally, from address E0 through FF are shown 32 locations 208 that are mapped into external buffer memory 28 (FIG. 1).

External buffer memory 28 (FIG. 1) can be accessed by CPU 10 by means of an address pointer. Three data access mechanisms are provided: fixed mode, sequential mode and random mode. In fixed mode, the CPU can repeatedly access the location to which the CPU pointer points. In sequential mode, the CPU can access contiguous locations in the memory without updating the pointer. (Ther peripheral controller increments the pointer after each access.) In random mode, random access to any 32-byte section is permitted without rewriting the pointer.

Figure 5:
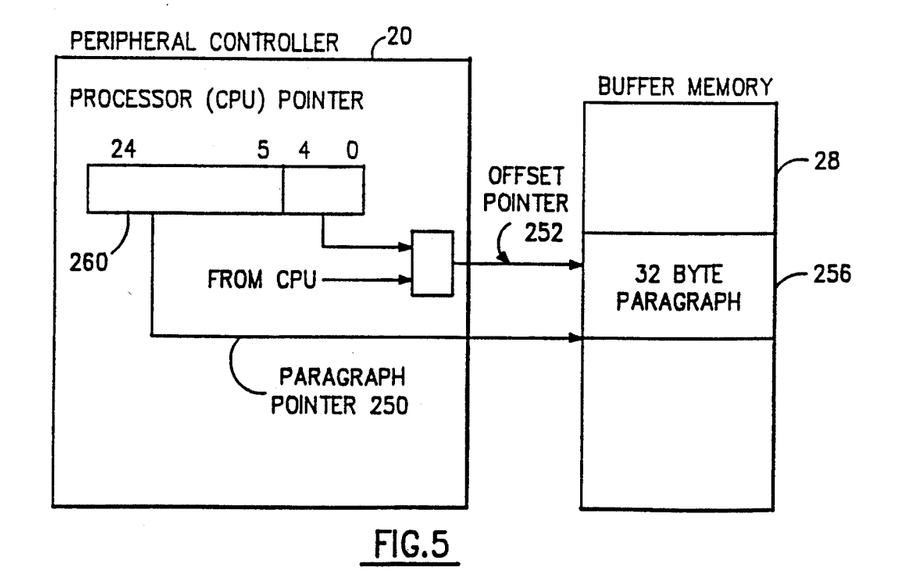
FIG. 5 is a block diagram showing the pointer control mechanism that controls memory access.

Referring now also to FIG. 5, the detail of the CPU buffer memory pointer mechanism is shown. A 24-bit wide pointer 260 occupies three byte-wide locations in internal register space 200 (FIG. 4) of peripheral controller 20. Bits 23 and 24 of pointer 260 are unused because in the preferred embodiment peripheral controller supports only a 4 Mbyte external memory 28.

Pointer 260 can be further divided into two portions: a 17-bit paragraph pointer 250 that identifies a 32-byte area or paragraph 256 in buffer memory 28 and a 5-bit offset pointer 252 that identifies a specific byte within the 32-byte paragraph 256.

As explained hereinbelow, different memory access modes are provided. The 5-bit offset value can be applied by CPU 10 directly.

In operation, the buffer memory subsystem operates to allow CPU 10 to access devices and memory on the buffer bus using a flow-thru access mode. Of the total address space of the subsystem (256 locations A[7:0]), only the lower 128 locations (00 through 7F) are mapped into internal registers. Whenever CPU 10 accesses a location in the upper 128 bytes (80 through FF) of address space, this request is translated into an access request for buffer bus 26.

CPU 10 may access buffer memory 28 during the normal power up sequence in order to check memory operation, during error recovery (which occurs relatively infrequently), and when data transfer operations are to be initiated.

The sequence of events for CPU 10 access of buffer bus 26 is as follows:
1) CPU 10 starts a flow-thru cycle by accessing a memory location in the range of 80 thru FF;
2) cycle is stretched by negating a READY signal;
3) address is decoded by CPU access request logic 110 to determine the buffer bus device/memory to be accessed and a request is generated for the internal bus arbiter 100;
4) when bus arbiter 100 can honor the CPU access request, the appropriate cycle is run; and
5) cycle is terminated by asserting the READY signal.

The buffer bus arbiter 100 uses a fixed priority scheme under the following priorities, listed in descending order:
CPU request
Internal sequencer request (for error correction)
Refresh request
FIFO to/from buffer
Host adapter to/from buffer As hereinabove mentioned, in addition to buffer memory 28, two devices are supported on buffer bus 26: host adapter device 24 and error processor 30. When CPU 10 accesses an address mapped to one of these devices 24 or 30, an access is performed on the selected device. The address applied to the device 24 or 30 is the same as the address on the lower five bits 258 of the CPU address lines (A[4:0]). The upper bits 260 are driven low.

Addresses 80 through 9F are mapped to host adapter device 24 and addresses C0 through DF are mapped to external error processor 30.

External buffer memory 28 can be accessed by CPU 10 at any time by executing a read or write of the register space that is mapped to buffer memory 28. That is, the buffer memory location appears as a register location of the subsystem to CPU 10. Whenever CPU 10 initiates a buffer memory access by accessing the appropriate register space, the requested access is performed. To perform the access, the arbiter 100 will have to arbitrate because buffer bus 26 may be used for another cycle at that time. The READY signal is used to lengthen the CPU cycle as required.

Part of the address of the buffer memory location to be accessed is generated by buffer memory pointer 260 loaded by CPU 10 in previous write cycles. Three buffer memory access modes are provided: fixed access mode, sequential access mode and paragraph random mode. They can be selected by programming a pointer control register, not shown, appropriately.

In fixed access mode, access is provided to the location addressed by the CPU pointer. Whenever CPU 10 accesses address location E0, the location at which the CPU pointer points is accessed. The value stored in that memory location is returned to CPU 10 to complete a read operation. It should be understood that writing data to buffer memory can likewise be accomplished at any time by using the aforementioned pointer mechanism. In other words, in the description herein, whenever memory can be accessed, data can be read or written by using the same accessing mechanism. Subsequent CPU accesses to other locations in buffer memory 28 require updating the CPU pointer.

The specific steps used in fixed access mode are as follows:

1) the CPU programs the CPU pointer with the address of the desired memory location;
2) the CPU programs the pointer control register with the code for fixed access mode;
3) the CPU initiates a peripheral controller access cycle at the appropriate register location (E0, for the preferred embodiment);
4) the CPU initiates a read cycle or a write cycle, as appropriate;
5) the CPU access request logic detects the CPU access, generates a request for the bus arbiter, and lengthens the CPU cycle by negating the READY signal;
6) when the bus arbiter allows the CPU access cycle to be executed, the CPU pointer sends the address of the desired location to the buffer memory;
7) data is read from the addressed memory location and returned to the CPU (read cycle), or data supplied by the CPU is written to the addressed memory location (write cycle), as appropriate; and
8) the CPU access cycle is terminated by asserting the READY signal.

In sequential access mode, whenever CPU 10 accesses location address E0, the location at which the CPU pointer points is accessed. For read operations, the value stored in that memory location is returned to CPU 10. Moreover, the CPU pointer is incremented.

If CPU 10 accesses register location E0 again without updating the CPU pointer, the next sequential memory location is accessed and, for read operations, the value stored in that memory location is returned to CPU 10. This allows rapid sequential access to buffer memory 28 without repeated updates of the CPU pointer by CPU 10.

The specific steps used in sequential access mode are as follows:

1) the CPU programs the CPU pointer with the address of the first memory location array to be accessed in a sequence;
2) the CPU programs the pointer control register with the code for sequential access mode;
3) the CPU initiates a peripheral controller access cycle at the appropriate register location (E0, for the preferred embodiment);
4) the CPU initiates a read cycle or a write cycle, as appropriate;
5) the CPU access request logic detects the CPU access, generates a request for the bus arbiter, and lengthens the CPU cycle by negating the READY signal;
6) when the bus arbiter allows the CPU access cycle to be executed, the CPU pointer sends the address of the desired location to the buffer memory;
7) data is read from the addressed memory location and returned to the CPU (read cycle), or data supplied by the CPU is written to the addressed memory location (write cycle), as appropriate;
8) the CPU access cycle is terminated by asserting the READY signal;
9) the peripheral controller increments the CPU pointer to point to the next location in the buffer memory; and
10) the CPU optionally accesses the next location in the buffer memory by executing steps (3)–(8) above.

In paragraph random mode, whenever CPU 10 accesses locations E0 through FF the address of the location to be accessed is computed by concatenating the upper bits in the CPU pointer and the lower five bits from the register address supplied by the CPU 10. The address thus formed is used to access buffer memory 28 and the value stored therein is returned to the CPU 10 in read operations.

This mode allows CPU 10 to set up a pointer to a 32-byte paragraph of buffer memory 28 first by writing the base address of this paragraph in the CPU pointer. CPU 10 can then access this block of memory in a fast random fashion. Addresses E0 through FF are mapped to buffer memory 28.

The specific steps used in paragraph random access mode are as follows:

1) the CPU programs the CPU pointer with the base address of the address of any memory location in the paragraph since the lower five bits of the pointer are not used in this mode;
2) the CPU programs the pointer control register with the code for paragraph random access mode;
3) the CPU initiates a peripheral controller access cycle at the appropriate register location (E0 - FF, in the preferred embodiment);
4) the CPU initiates a read cycle or a write cycle, as appropriate;
5) the CPU access request logic detects the CPU access, generates a request for the bus arbiter, and lengthens the CPU cycle by negating the READY signal;
6) when the bus arbiter allows the CPU access cycle to be executed, the CPU pointer sends the upper 19 bits of the address, the lower 5 bits of the address being obtained from those applied by the CPU in its current access cycle;
7) data is read from the addressed memory location and returned to the CPU (read cycle), or data supplied by the CPU is written to the addressed memory location (write cycle), as appropriate;
8) the CPU access cycle is terminated by asserting the READY signal; and
9) the CPU optionally accesses any other location in the addressed 32-byte block in the buffer memory by executing steps (3)–(8) above.

While the three methods of accessing buffer memory 28 by CPU 10 were hereinabove described, CPU 10 can also access the host adapter registers specifically as follows:

1) the CPU initiates a peripheral controller access cycle at the appropriate register location (80 - 9F, for the preferred embodiment);
2) the CPU initiates a read cycle or a write cycle, as appropriate, for reading or writing to the register;
3) the CPU access request logic detects the CPU access, generates a request for the bus arbiter, and lengthens the CPU cycle by negating the READY signal;
4) when the arbiter allows the CPU access cycle to be executed, the value applied on the lower 5 bits of the CPU address bus is applied as the register address of the host adapter device;
5) the upper address bits are driven to zero;

6) data is read from the addressed register and returned to the CPU (read cycle), or data supplied by the CPU is written to the addressed register (write cycle);

7) the appropriate select signal and read or write control signal is activated; and 8) the CPU access cycle is terminated by asserting the READY signal.

Finally, CPU 10 can also access the error processor registers specifically as follows:

1) the CPU initiates a peripheral controller access cycle at the appropriate register location (C0 - DF, for the preferred embodiment);

2) the CPU initiates a read cycle or a write cycle, as appropriate, for reading or writing to the register;

3) the CPU access request logic detects the CPU access, generates a request for the bus arbiter, and lengthens the CPU cycle by negating the READY signal;

4) when the bus arbiter allows the CPU access cycle to be executed, the value applied on the lower 5 bits of the CPU address bus is applied as the register address of the error processor device;

5) the upper address bits are driven to zero;

6) data is read from the addressed register and returned to the CPU (read cycle), or data supplied by the CPU is written to the addressed register (write cycle);

7) the appropriate select signal and read or write control signal is activated; and 8) the CPU access cycle is terminated by asserting the READY signal.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method of allowing a CPU to access data in a memory device by means of a peripheral controlling means having a plurality of registers, the steps comprising:
   a) programming a CPU pointer with the address of a predetermined memory location;
   b) programming a pointer control register;
   c) initiating a peripheral controller access cycle at a predetermined register location;
   d) initiating an access cycle in said CPU;
   e) generating a request for a bus arbiter to allow said CPU to use a data bus;
   f) lengthening said CPU access cycle by negating a READY signal;
   g) sending said address of a memory location from said CPU to said memory device via said bus when said bus arbiter allows said CPU access cycle to be executed;
   h) accessing data at said addressed memory location via said bus; and
   i) terminating said CPU access cycle by asserting said READY signal.

2. The method in accordance with claim 1 wherein said data access comprises reading data stored in said memory device.

3. The method in accordance with claim 1 wherein said data access comprises storing data in said memory device.

4. The method in accordance with claim 1, the steps further comprising:

j) incrementing said CPU pointer to point to the next memory location in said memory device; and k) accessing said next memory location by performing steps (c)–(i).

5. The method in accordance with claim 4 wherein said data access comprises reading data stored in said memory device.

6. The method in accordance with claim 4 wherein said data access comprises storing data in said memory device.

7. A method of allowing a CPU to access data in a memory device by means of a peripheral controlling means having a plurality of registers, said method comprising the steps of:
   a) programming a CPU pointer with the address of a predetermined memory location;
   b) programming a pointer control register;
   c) initiating a peripheral controller access cycle at a predetermined register location;
   d) initiating an access cycle in said CPU;
   e) generating a request for a bus arbiter to allow said CPU to use a data bus;
   f) lengthening said CPU access cycle by negating a READY signal;
   g) sending said address of a memory location from said CPU to said memory device via said bus when said bus arbiter allows said CPU access cycle to be executed, wherein said step of sending said address of a memory location to said memory device comprises
      (i) sending a first set of predetermined bits of said address specified by said CPU pointer, and
      (ii) sending a second set of predetermined bits of said address specified by said CPU in the current access cycle thereof;
   h) accessing data at said addressed memory location via said bus; and
   i) terminating said CPU access cycle by asserting said READY signal.

8. The method in accordance with claim 7 wherein said data access comprises reading data stored in said memory device.

9. The method in accordance with claim 7 wherein said data access comprising storing data in said memory device.

10. A method of allowing a CPU to access data in a device register on a buffer bus, the steps comprising:
    a) initiating a peripheral controller access cycle at a predetermined register location;
    b) initiating an access cycle in said CPU;
    c) generating a request for a bus arbiter to allow said CPU to use said buffer bus;
    d) lengthening said CPU access cycle;
    e) converting a value on a portion of a CPU address bus to an address of said device register when said bus arbiter allows said CPU access cycle to be executed via said buffer bus;
    f) accessing data at said device register location via said buffer bus;
    g) activating a select signal and an access control signal; and
    h) terminating said CPU access cycle.

11. The method in accordance with claim 10 wherein host adapter registers are mapped into said device register.

12. The method in accordance with claim 11 wherein said data access comprises reading data stored in said host adapter registers.

13. The method in accordance with claim 11 wherein said data access comprises storing data in said host adapter registers.

14. The method in accordance with claim 10 wherein error processor registers are mapped into said device register.

15. The method in accordance with claim 14 wherein said data access comprises reading data stored in said error processor registers.

16. The method in accordance with claim 14 wherein said data access comprises storing data in said error processor registers.

* * * * *